UNITED STATES PATENT OFFICE.

WALTER NORMAN HAWORTH, OF FIFESHIRE, SCOTLAND, AND FREDERICK WILLIAM ATACK, OF MANCHESTER, ENGLAND.

MANUFACTURE OF AROMATIC ALKYL-AMINO COMPOUNDS.

1,426,380.  Specification of Letters Patent.  Patented Aug. 22, 1922.

No Drawing.  Application filed January 19, 1920. Serial No. 352,538.

*To all whom it may concern:*

Be it known that we, WALTER NORMAN HAWORTH and FREDERICK WILLIAM ATACK, subjects of the King of Great Britain, residing at Fifeshire, Scotland, and Manchester, in the county of Lancaster and Kingdom of England, respectively, have invented certain new and useful Improvements in and Relating to the Manufacture of Aromatic Alkyl-Amino Compounds, of which the following is a specification.

This invention relates to improvements in the alkylation of primary amines.

According to the invention we treat the amine, especially 1 amino or 2 amino anthraquinone, with an alkyl sulphate in presence of a liquid diluent and a neutralizing agent at a relatively high temperature. Preferably we use a high boiling solvent as a diluent and heat to a temperature over 150° C.; we find that the temperature is of importance in determining the course of the reaction. As neutralizing agents, we may employ sodium carbonate, magnesium oxide or even sodium acetate, but preferably we employ a mild alkaline reagent for this purpose such as sodium carbonate or magnesium oxide as distinct from sodium acetate. In any case, however, we use a neutralizing agent which is insoluble in the diluent or chemically inactive with respect thereto; sodium hydroxide is thus excluded. This reagent is unsuitable because it reacts with various solvents, e. g. nitrobenzene, giving undesirable by-products such as azoxy compounds, and it further causes undesirable side reactions to take place at high temperatures, e. g. in the case of 2-amino-anthraquinone.

We prefer to conduct the reaction by boiling the solution, or in some cases the suspension, of the amine in a high boiling solvent and adding the alkyl sulphate thereto in presence of the neutralizing agent. Suitable solvents are nitrobenzene or tetrachloroethane, but in the case of aniline for instance, the amine itself may serve as a high boiling diluent for the alkyl sulphate.

*Example 1. Methylation of 1 aminoanthraquinone.*

20 parts 1 aminoanthraquinone.
20 parts anhydrous sodium carbonate.
216 parts nitrobenzene.
17½ parts dimethyl sulphate.

(In each case using parts by weight.)

The amine is dissolved in the notrobenzene and the sodium carbonate added; the whole is heated under a reflux condenser until briskly boiling. 12½ parts of dimethyl sulphate are then gradually introduced during ½ hour and boiling continued ½ hour. The remaining 5 parts of dimethyl sulphate are then gradually introduced during ½ hour and boiling continued ½ hour, making 2 hours in all.

After removal of the nitrobenzene by distillation in steam, the residue is filtered off and washed with cold alcohol to remove remaining nitrobenzene. The alcoholic washings are partly evaporated when a further portion crystallizes out.

The product contains a little unchanged amine. After purifying by solution in sulphuric acid and reprecipitation with water, the yield is 87%.

If desired, the proportions of nitrobenzene and amine may be varied so that most of the product crystallizes out by merely cooling the reaction mixture and filtering, when the mother liquor can be further treated or used as the solvent for a subsequent preparation.

*Example 2. Ethylation of 1.aminoanthraquinone.*

5 parts by weight of 1 aminoanthraquinone.
90 parts by weight of nitrobenzene.
7 parts by weight of anhydrous sodium carbonate. The mixture is heated to boiling under reflux condenser and during ¾ hour 10½ parts by weight of diethyl sulphate are gradually added. The boiling is continued for ½ hour.

The nitrobenzene is removed by distillation in steam and the residue crystallized from strong acetic acid.

The quantity of nitrobenzene may be diminished and the amount of diethyl sulphate used may be about ⅓ the above amount. If only one third is used, ethylation is not sufficiently complete.

*Example 3. Methylation of 2.aminoanthraquinone.*

5 parts by weight of 2.aminoanthraquinone.
5 parts by weight of anhydrous sodium carbonate.

72 parts by weight of nitrobenzene.
6 parts by weight of dimethyl sulphate.

The dimethyl sulphate is added to the boiling solution with stirring during ½ hour and boiling is continued (under reflux) for a further hour. The nitrobenzene is removed by steam distillation, the product is dried and recrystallized from strong acetic acid.

It must be carefully noted that in this case the dimethyl derivative is apparently obtained whereas in Examples 1 and 2 the monoalkyl derivative is isolated as the chief product.

*Example 4. Ethylation of α.naphthylamine.*

10 parts by weight of α.naphthylamine.
10 parts by weight of anhydrous sodium carbonate.
84 parts by weight of nitrobenzene.
13 parts by weight of diethyl sulphate.

The mixture is boiled under reflux with stirring, and the diethyl sulphate gradually added during 1 hour. The boiling is continued ½ hour. After cooling, the product is extracted with concentrated hydrochloric acid. The extract is washed with petroleum ether, made alkaline and extracted with a mixture of ether and benzene and filtered from a little greyish solid. The solvent is removed by evaporation. 14 parts by weight of water (and an equal volume of concentrated hydrochloric acid) are added; the mixture becomes almost solid on standing. On filtration the mass is washed with a little water and recrystallized from alcohol when the hydrochloride is obtained.

It will be seen that in Examples 1, 2 and 4 the monoalkyl derivative is obtained whereas in Example 3 a dialkyl derivative is obtained. In applying our process to other amines, we obtain alkylated products, but in each case it is necessary to analyze the substance to determine whether a mono- or dialkyl derivative has resulted, or a mixture. In the case of aniline, a mixture of dimethyl aniline and methyl aniline is obtained by treating boiling aniline, with or without tetrachloroethane, with dimethyl sulphate in presence of anhydrous sodium carbonate.

The high boiling solvent must of course be inert towards the bodies taking part in the reaction, the anhydrous sodium carbonate can be replaced by any similar suitable mild alkaline reagent such as magnesium oxide.

We declare that what we claim is:—

1. A process of alkylating primary amines which consists in treating the amine with an alkyl sulphate in presence of a liquid diluent and a neutralizing agent insoluble in the diluent and inactive therewith at a relatively high temperature over 120° C.

2. A process of alkylating primary amines which consists in treating the amine with an alkyl sulphate in presence of a diluent and a mild alkaline reagent at a temperature not lower than 120° C.

3. A process of alkylating aminoanthraquinone which consists in treating the aminoanthraquinone with an alkyl sulphate in presence of a liquid diluent and a mild alkaline reagent at a relatively high temperature over 120° C.

4. A process of alkylating 1 aminoanthraquinone which consists in treating the 1 aminoanthraquinone with an alkyl sulphate in presence of a liquid diluent and a mild alkaline reagent at a relatively high temperature over 120° C.

5. A process of alkylating 1 aminoanthraquinone which consists in treating the 1 aminoanthraquinone with diethyl sulphate in presence of a liquid diluent and a mild alkaline reagent at a relatively high temperature over 120° C.

6. A process of alkylating aminoanthraquinone which consists in heating aminoanthraquinone with alkyl sulphate in presence of a liquid diluent and neutralizing agent insoluble in said diluent and inactive therewith at relatively high temperature over 120° C.

7. The process of alkylating amino-anthraquinone which consists in heating it with an alkyl sulphate in presence of nitrobenzene and a mild alkaline reagent at temperatures above 120° C.

8. The process of alkylating aminoanthraquinone which consists in boiling it above 150° C. in nitrobenzene with an alkyl sulphate in presence of a mild alkaline reagent.

In witness whereof, we have hereunto signed our names this 2nd day of January 1920.

WALTER NORMAN HAWORTH.
FREDERICK WILLIAM ATACK.